(12) United States Patent
Gu et al.

(10) Patent No.: US 10,609,398 B2
(45) Date of Patent: Mar. 31, 2020

(54) ULTRA-LOW BITRATE CODING BASED ON 3D MAP RECONSTRUCTION AND DECIMATED SUB-PICTURES

(71) Applicant: Black Sesame Technologies Inc., Santa Clara, CA (US)

(72) Inventors: Qun Gu, San Jose, CA (US); Jizhang Shan, Los Gatos, CA (US)

(73) Assignee: Black Sesame International Holding Limited, Santa Clara, CA (US)

( * ) Notice: Subject to any disclaimer, the term of this patent is extended or adjusted under 35 U.S.C. 154(b) by 9 days.

(21) Appl. No.: 15/926,729

(22) Filed: Mar. 20, 2018

(65) Prior Publication Data

US 2019/0037222 A1    Jan. 31, 2019

Related U.S. Application Data

(60) Provisional application No. 62/537,979, filed on Jul. 28, 2017.

(51) Int. Cl.
*H04N 19/23* (2014.01)
*H04N 19/124* (2014.01)
*H04N 19/167* (2014.01)

(52) U.S. Cl.
CPC .......... *H04N 19/23* (2014.11); *H04N 19/124* (2014.11); *H04N 19/167* (2014.11)

(58) Field of Classification Search
CPC .... H04N 19/61; H04N 19/176; H04N 19/593; H04N 19/107; H04N 19/40; H04N 19/159; H04N 19/115; H04N 19/70; H04N 19/126; H04N 19/147; H04N 19/46; H04N 19/86; H04L 12/1822; H04L 12/1863; H04L 1/0041; H04L 1/0045; H04L 1/0057; H04L 2001/0096; H04L 65/403; H04L 65/605; H04L 47/10; H04L 47/22; H04L 47/25; H04L 47/38; H04L 65/1083

See application file for complete search history.

(56) References Cited

U.S. PATENT DOCUMENTS

| | | | | |
|---|---|---|---|---|
| 6,496,607 B1 * | 12/2002 | Krishnamurthy | ...... | H04N 19/46 375/E7.082 |
| 6,519,283 B1 * | 2/2003 | Cheney | ................ | H04N 19/159 348/568 |
| 6,580,810 B1 * | 6/2003 | Yang | .................. | G06K 9/00228 348/14.1 |
| 8,364,698 B2 * | 1/2013 | Delgo | .................... | G11B 27/28 707/769 |

(Continued)

*Primary Examiner* — Leron Beck
*Assistant Examiner* — Kehinde Abimbola
(74) *Attorney, Agent, or Firm* — Timothy T. Wang; Ni, Wang & Massand, PLLC (57) ABSTRACT

A method of ultra-low rate video encoding, including capturing a frame within a video stream, capturing a global position of the frame, capturing a heading of the frame, linking the global position and the heading to the frame, determining a foreground of the frame based on the global position of the frame and the heading of the frame, determining an at least one region of interest within the foreground, analyzing the at least one region of interest, removing a background from the frame based on the global position and the heading, wherein the background is complementary to the foreground and encoding the foreground, the global position, the heading and the at least one region of interest.

17 Claims, 12 Drawing Sheets

(56) References Cited

U.S. PATENT DOCUMENTS

| | | | |
|---|---|---|---|
| 9,230,300 B2* | 1/2016 | Bekaert | G06T 3/4038 |
| 9,807,316 B2* | 10/2017 | Jen | G06T 7/10 |
| 9,934,614 B2* | 4/2018 | Ramsby | G06T 19/006 |
| 9,965,865 B1* | 5/2018 | Agrawal | G06T 7/194 |
| 10,217,195 B1* | 2/2019 | Agrawal | G06T 7/194 |
| 2003/0123751 A1* | 7/2003 | Krishnamurthy | H04N 19/46 |
| | | | 382/282 |
| 2010/0070523 A1* | 3/2010 | Delgo | G11B 27/28 |
| | | | 707/769 |
| 2011/0255741 A1* | 10/2011 | Jung | G06K 9/00369 |
| | | | 382/103 |
| 2012/0249789 A1* | 10/2012 | Satoh | G06K 9/00832 |
| | | | 348/143 |
| 2012/0269456 A1* | 10/2012 | Bekaert | G06T 3/4038 |
| | | | 382/284 |
| 2013/0014016 A1* | 1/2013 | Delgo | G11B 27/28 |
| | | | 715/723 |
| 2013/0283143 A1* | 10/2013 | Petajan | G06F 17/241 |
| | | | 715/230 |
| 2015/0229692 A1* | 8/2015 | Clark | H04L 65/602 |
| | | | 709/231 |
| 2015/0229693 A1* | 8/2015 | Clark | H04L 65/602 |
| | | | 345/611 |
| 2015/0254905 A1* | 9/2015 | Ramsby | G06T 19/006 |
| | | | 345/419 |
| 2015/0278616 A1* | 10/2015 | Li | G06K 9/00825 |
| | | | 382/103 |
| 2015/0310365 A1* | 10/2015 | Li | G06Q 10/0639 |
| | | | 705/7.38 |
| 2016/0073040 A1* | 3/2016 | Jen | G06T 7/10 |
| | | | 348/239 |
| 2016/0274743 A1* | 9/2016 | Sica | G06F 3/0482 |
| 2017/0278295 A1* | 9/2017 | Chui | G06T 15/06 |
| 2018/0154211 A1* | 6/2018 | Clark | G01C 25/005 |
| 2018/0262789 A1* | 9/2018 | Foulzitzis | H04N 21/23614 |

\* cited by examiner

ULTRA-LOW BITRATE CODING BASED ON 3D MAP RECONSTRUCTION AND DECIMATED SUB-PICTURES

BACKGROUND

Technical Field

The instant disclosure may be applicable to ultra-low bitrate encoding for use with advanced driver assistance systems (ADAS), where encoding of background objects is skipped and region of interest objects in the foreground are encoded.

Background

Current encoding for advanced driver assistance systems encodes objects in an entire scene including static background objects. This inclusion of background objects in the encoding process entails the processing and storage of large amounts of information which is of marginal use to a driver.

SUMMARY

In one embodiment a method of ultra-low rate video encoding, including capturing a frame within a video stream, capturing a global position of the frame, capturing a heading of the frame, linking the global position and the heading to the frame, determining a foreground of the frame based on the global position of the frame and the heading of the frame, determining an at least one region of interest within the foreground, analyzing the at least one region of interest, removing a background from the frame based on the global position and the heading, wherein the background is complementary to the foreground and encoding the foreground, the global position, the heading and the at least one region of interest.

In another embodiment a method of ultra-low rate video decoding, including decoding an encoded foreground of a frame within a video stream, wherein the encoded foreground includes at least a global position of the frame and a heading of the frame, extracting the global position of the frame and the heading of the frame, receiving a local image based on the global position of the frame and the heading of the frame and blending the local image and the foreground.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

The modern technology of 3D mapping gives detailed information of static scenes such as buildings, streets and highways. The 3D street view provides high-resolution images of roads as well as surrounding buildings.

In extended vision applications the system integrates vision (image/video) as a main data input combined with other information such as Radar, Lidar, infrared, global positioning system (GPS), etc. to provide additional data input.

Information from static scenes is useful, however, it takes great deal of storage and processing effort to process repeated static scenes. One possible proposed method preprocesses frames within the video stream to remove static background images and which may result in image/video sequences compressed to a much lower bit-rate. The system integrates into industrial standard formats, including but not limited to moving pictures experts group 4 (MPEG4), H.264 and high efficiency video coding (HEVC).

The method may work in tandem with an advanced driver assistance system (ADAS). It may utilize information of ADAS resulting in semantic segmentation and object detection that separates video scenes into background objects, such as buildings, sky, trees, etc. and regions of interest (ROIs) objects such as vehicles, road signs and pedestrians.

In one example the method skips encoding background objects and simply encodes ROI objects into a compressed bitstream, which results in reduction in bitrate.

Figure 1:
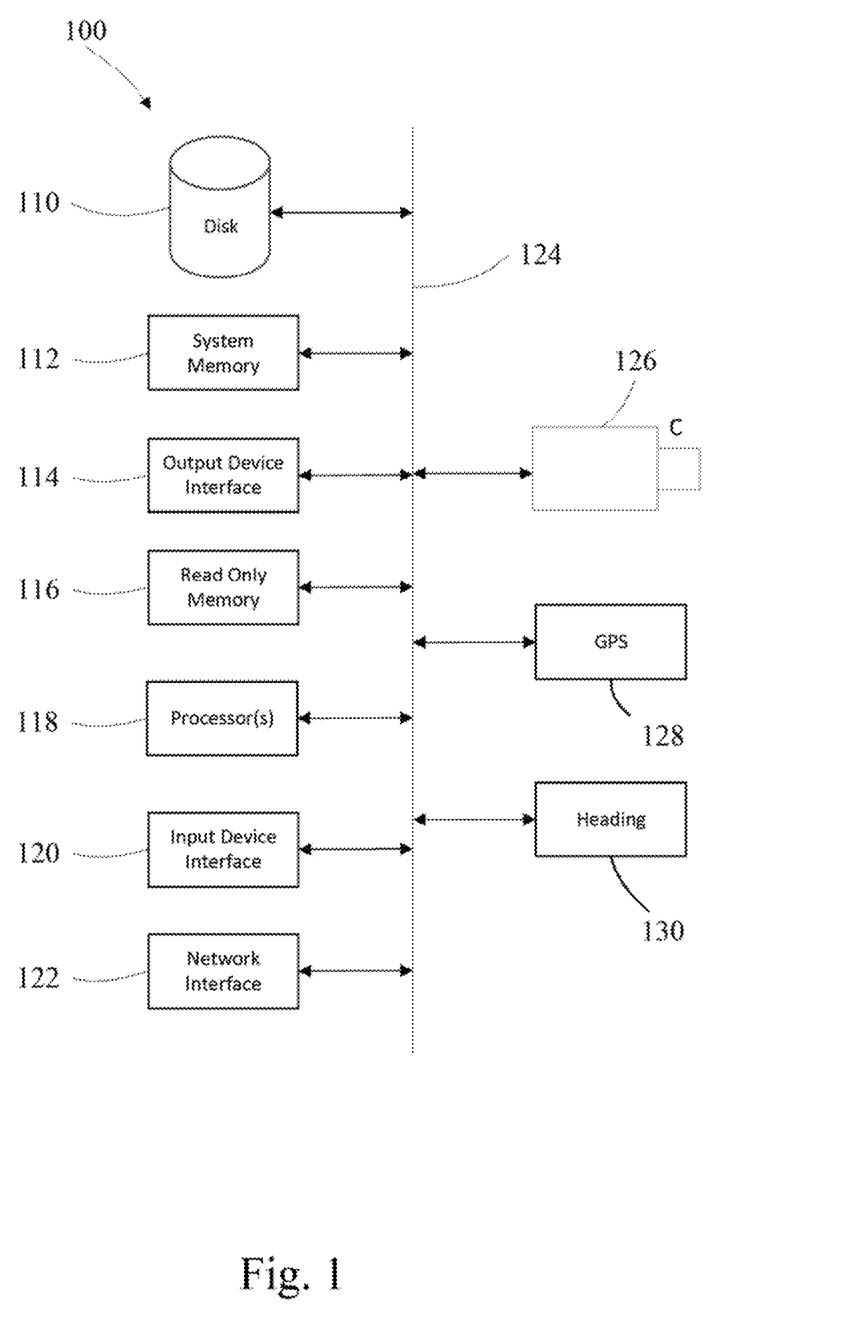
FIG. 1 is a first system layout in accordance with one embodiment of the disclosure.

FIG. 1 depicts an example electronic system for use in connection with a mobile platform such as an automobile, semi and the like. Electronic system 100 may be a computing device for execution of software associated with the operation of one or more portions or steps of process 800, 900, 1000, 1100 or 1200, or components and processes provided by FIGS. 8-12. Electronic system 100 may be an embedded computer, personal computer or a mobile device such as a tablet computer, laptop, smart phone, personal digital assistant (PDA), or other touch screen or television with one or more processors embedded therein or coupled thereto, or any other sort of computer-related electronic device having wireless connectivity.

Electronic system 100 may include various types of computer readable media and interfaces for various other types of computer readable media. In the depicted example, electronic system 100 includes a bus 124, processor(s) 118, a system memory 112, a read-only memory (ROM) 116, a permanent storage device 110, an input device interface 120, an output device interface 114, and one or more network interfaces 122. In some implementations, electronic system 100 may include or be integrated with other computing devices or circuitry for operation of the various components and processes previously described. In one embodiment of the present disclosure the processor(s) 118 is coupled through the bus 124 to camera 126, global positioning system (GPS) module 128 and heading module 130, which may encompass accelerometers, gyros and the like.

Bus 124 collectively represents all system, peripheral, and chipset buses that communicatively connect the numerous internal devices of electronic system 100. For instance, bus 124 communicatively connects processor(s) 118 with ROM 116, system memory 112, permanent storage device 110, camera 126, GPS module 128 and heading module 130.

From these various memory units, processor(s) 118 retrieves instructions to execute and data to process in order to execute the processes of the subject disclosure. The processing unit(s) can be a single processor or a multi-core processor in different implementations.

ROM 116 stores static data and instructions that are used by processor(s) 118 and other modules of the electronic system. Permanent storage device 110, on the other hand, is a read-and-write memory device. This device is a non-volatile memory unit that stores instructions and data even when electronic system 100 is off. Some implementations of the subject disclosure use a mass-storage device (such as a magnetic or optical disk and its corresponding disk drive) as permanent storage device 110.

Other implementations use a removable storage device (such as a floppy disk, flash drive, and its corresponding disk drive) as permanent storage device 110. Like permanent storage device 110, system memory 112 is a read-and-write memory device. However, unlike permanent storage device 110, system memory 112 is a volatile read-and-write memory, such a random access memory. System memory 112 stores some of the instructions and data that the processor needs at runtime. In some implementations, the processes of the subject disclosure are stored in system memory 112, permanent storage device 10, and/or ROM 116. From these various memory units, processor(s) 118 retrieves instructions to execute and data to process in order to execute the processes of some implementations.

Bus 124 also connects to input and output device interfaces 120 and 114, respectively. Input device interface 120 enables the user to communicate information and select commands to the electronic system. Input devices used with input device interface 120 include, for example, alphanumeric keyboards and pointing devices (also called "cursor control devices"). Output device interfaces 114 enables, for example, the display of images generated by the electronic system 100. Output devices used with output device interface 114 include, for example, printers and display devices, such as cathode ray tubes (CRT) or liquid crystal displays (LCD). Some implementations include devices such as a touchscreen that functions as both input and output devices.

Finally, as shown in FIG. 1, bus 124 also couples electronic system 100 to a network (not shown) through network interfaces 122. Network interfaces 122 may include, for example, a wireless access point (e.g., Bluetooth or Wi-Fi) or radio circuitry for connecting to a wireless access point. Network interfaces 122 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 100 can be used in conjunction with the subject disclosure.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. Data generated at the client device (e.g., a result of the user interaction) can be received from the client device at the server.

Figure 2:
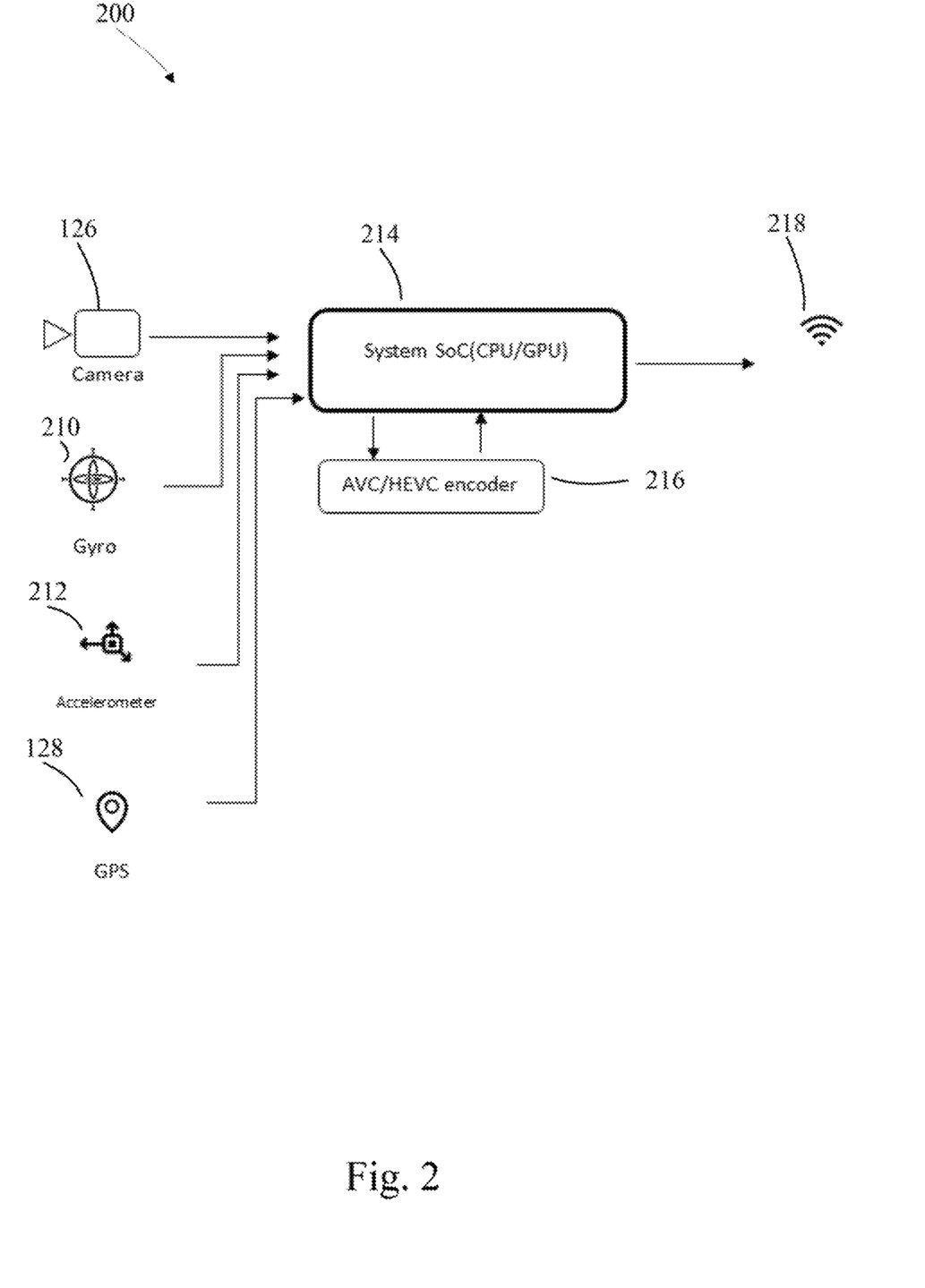
FIG. 2 is a second system layout in accordance with one embodiment of the disclosure.

FIG. 2 depicts a second example electronic system 200. The system has a camera 126 which may be a camera having a lens and complementary metal oxide semiconductor (CMOS) image sensor, an infrared image sensor, a lidar image sensor, a radar image sensor or the like. The system includes a global position device 128 such as GPS, Global Navigation Satellite System (GNSS), GLONASS, BeiDou (BDS), Galileo, Indian Regional Navigation Satellite System (IRNSS), Quasi-Zenith Satellite System (QZSS). Legenda or the like. The system also includes at least one of a gyroscope 210 and an accelerometer 212. A video encoder 216 is capable of encoding in a standardized format such as advanced video coding (AVC)/high efficiency video encoding (HEVC), a system on a chip 214 (SOC) platform (CPU/GPU) communicating wirelessly 218 with the surroundings in a format such as 3G, 4G, long term evolution (LTE), 5G and the like.

Figure 3:
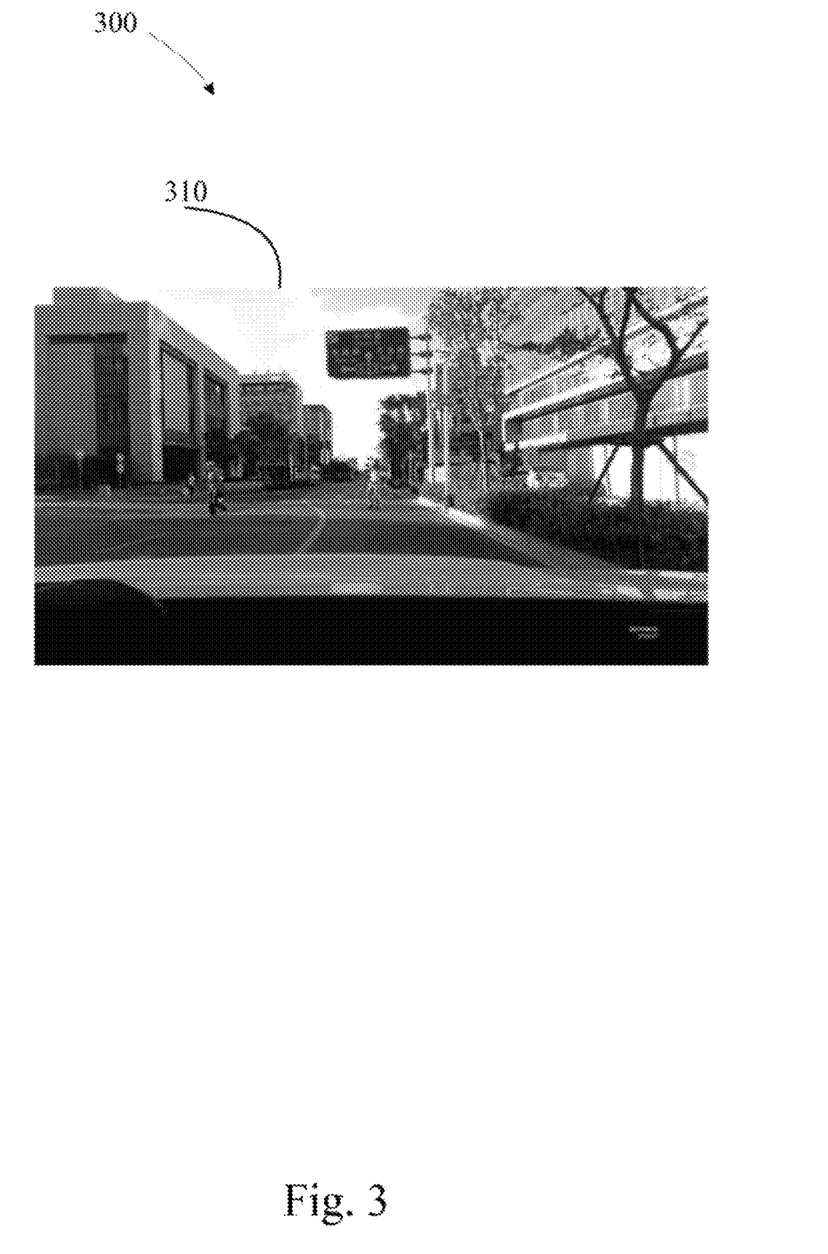
FIG. 3 is an illustration of an unmodified frame of a video stream.

FIG. 3 depicts an unedited frame 310 of a video stream. Within the frame are stationary immobile objects which comprise a background, regions of interest such as people in the street, street signs and like. This unedited video stream frame shows the large number of objects in the frame, most of which have no interest for a specific set of actions such as advanced driver assistance.

Figure 4:
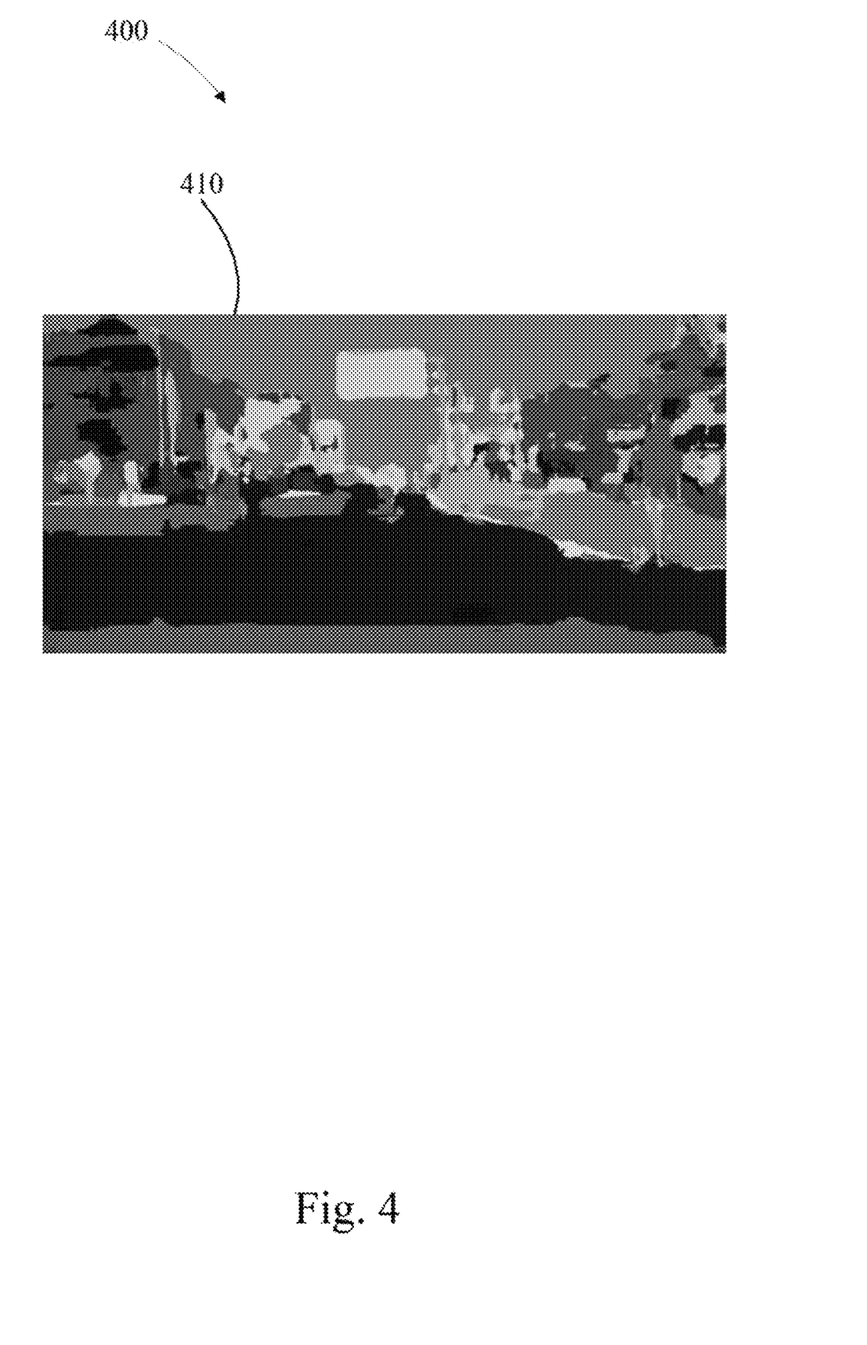
FIG. 4 is an illustration of the frame of the video stream with general object identification in accordance with one embodiment of the disclosure.
Figure 5:
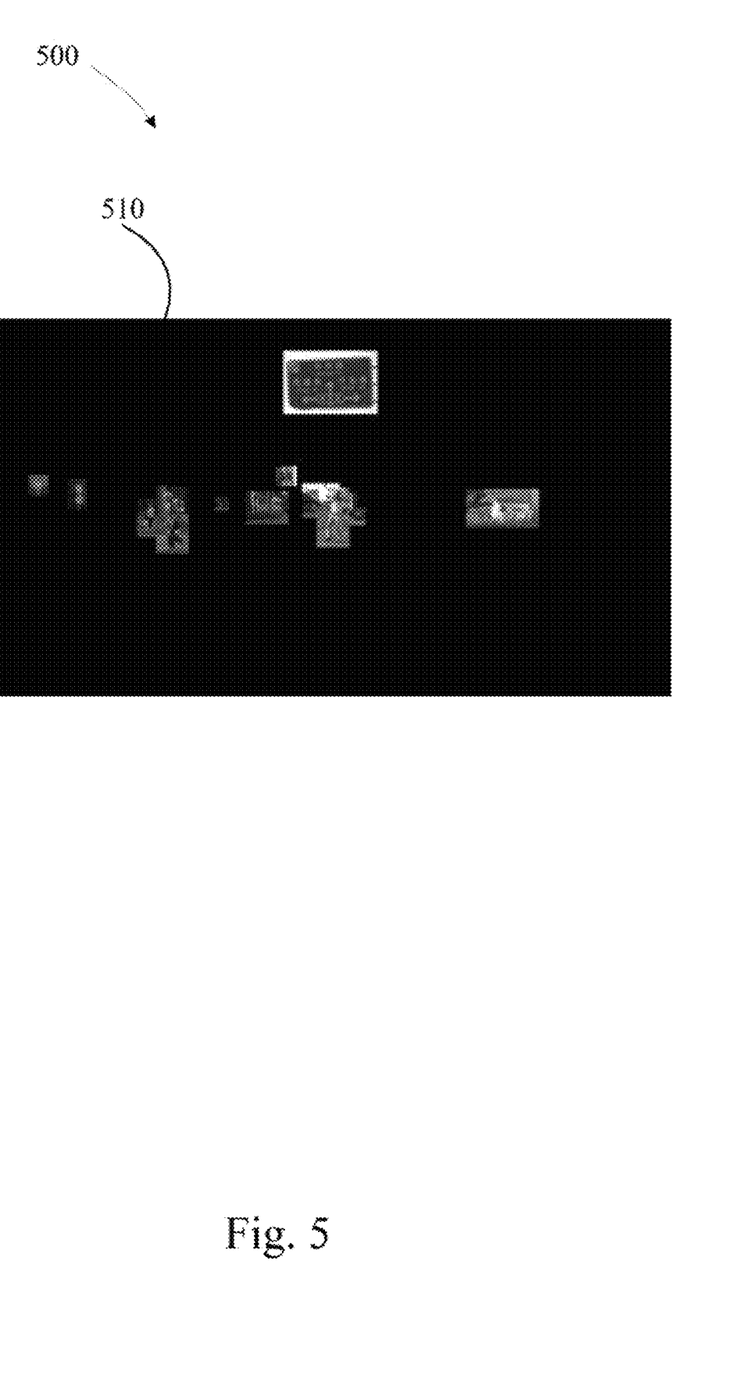
FIG. 5 is an illustration of the frame of the video stream with the background removed in accordance with one embodiment of the disclosure.

FIG. 4 depicts an edited frame 410 of a video stream. In this edited frame region of interest cropping is shown in which semantic segmentation detects free space, obstacles, etc. This provides assists in the detection of regions of interest. In one example, the regions of interest are encoded and the non-ROIs are removed as is shown in 510 of FIG. 5. Adaptive quantization based on object categories is also shown in which ROIs are assigned to different categories, such as vehicles and pedestrians, which may result in different quantization levels for video compression of the different objects. Variable quantization may also be applied to objects within an ROI to determine its object category.

Figure 6:
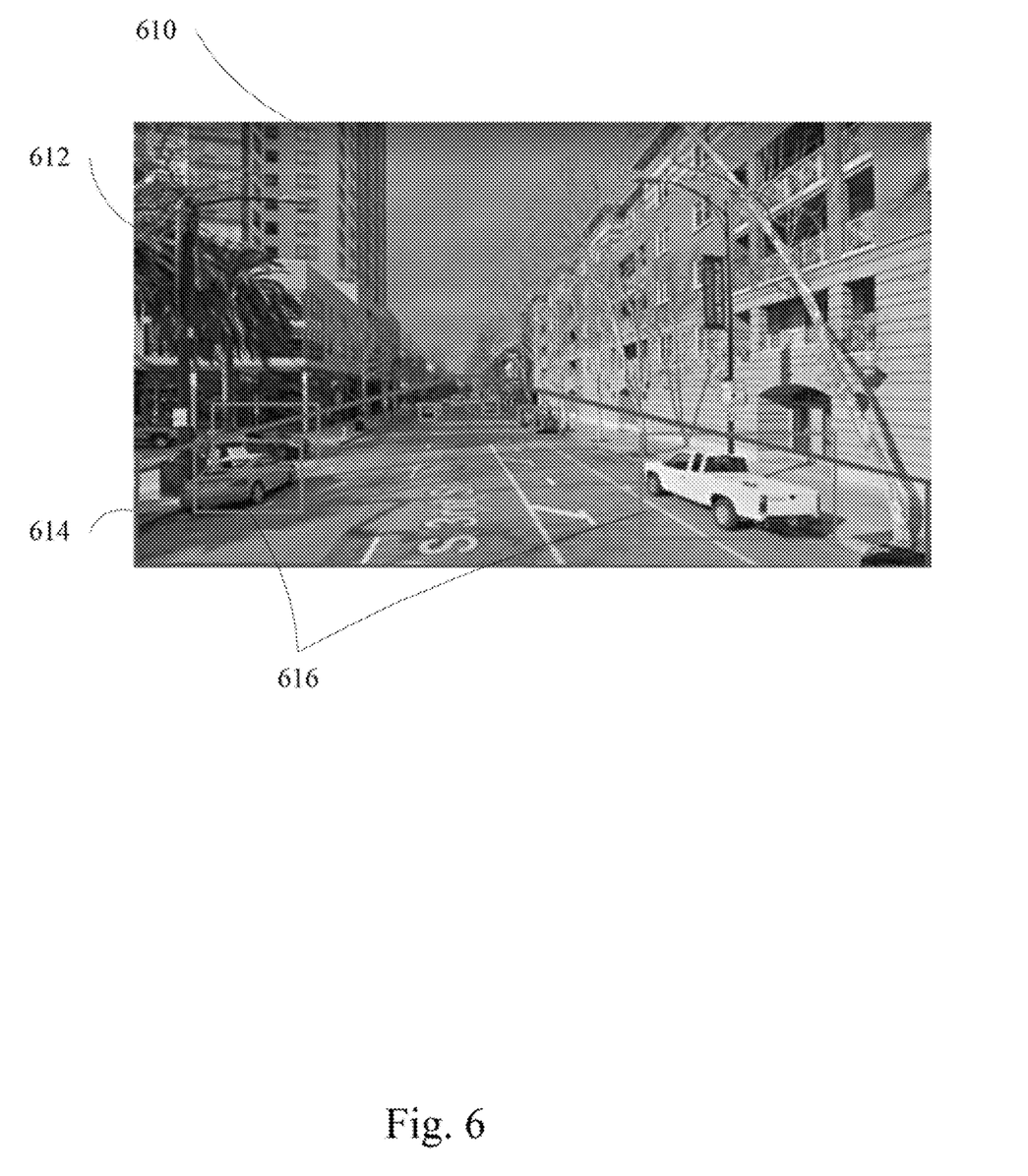
FIG. 6 is a first illustration of the frame of the video stream in which the background, foreground and regions of interest are identified in accordance with one embodiment of the disclosure.

FIG. 6 depicts a segmented frame 610 of a video stream within a city having a background 612, a foreground region of interest 614 within the red boundary and individual objects 616 within the foreground region of interest shown within green boxes. In this example, the background would be erased from the frame and the foreground and objects of interest would be encoded. The quantization level may vary from the background to the individual objects of interest.

Figure 7:
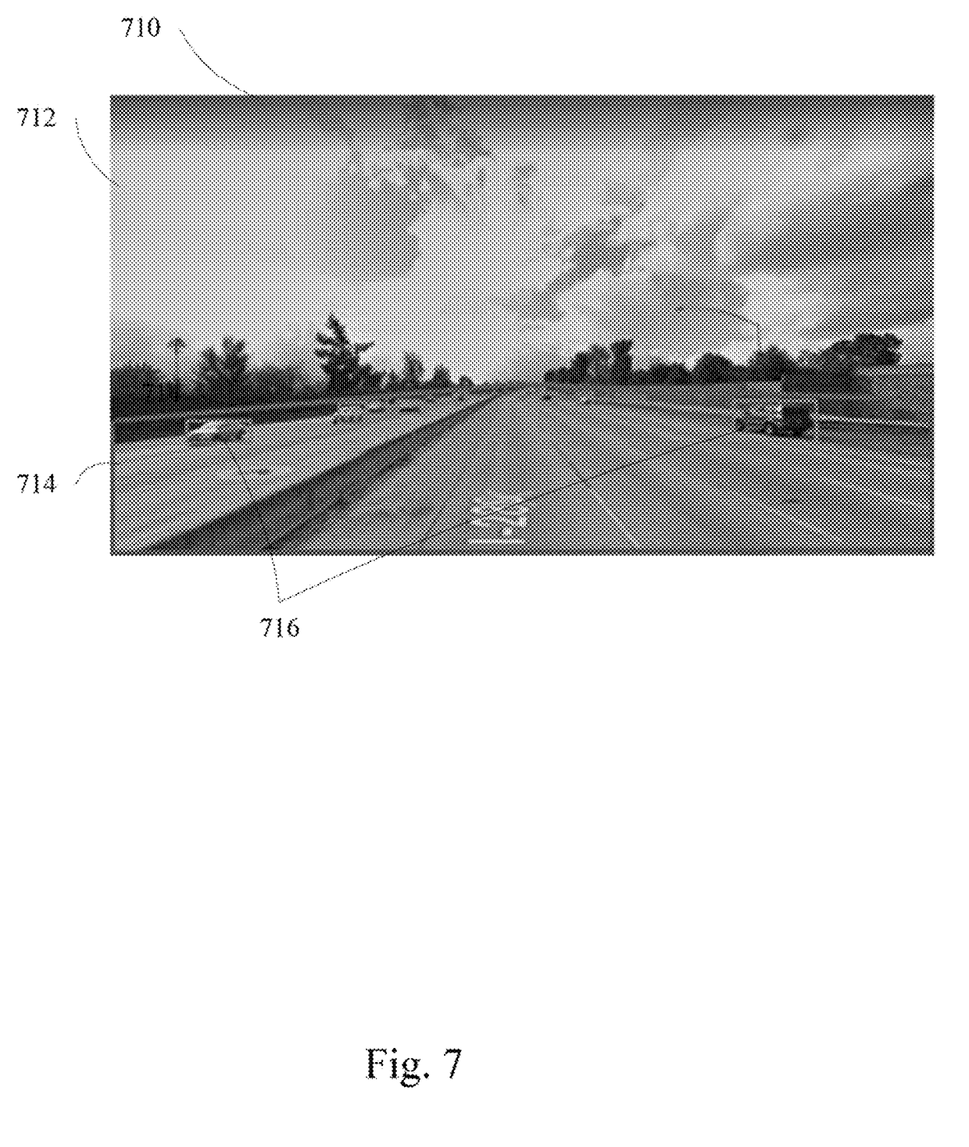
FIG. 7 is a second illustration of the frame of the video stream in which the background, foreground and regions of interest are identified in accordance with one embodiment of the disclosure.

FIG. 7 depicts a segmented frame 710 of a video stream on a highway having a background 712, a foreground region of interest 714 within the red boundary and individual objects 716 within the foreground region of interest shown within green boxes. In this example, the background would be erased from the frame and the foreground and objects of interest would be encoded. The quantization level may vary from the background to the individual objects of interest.

Figure 8:
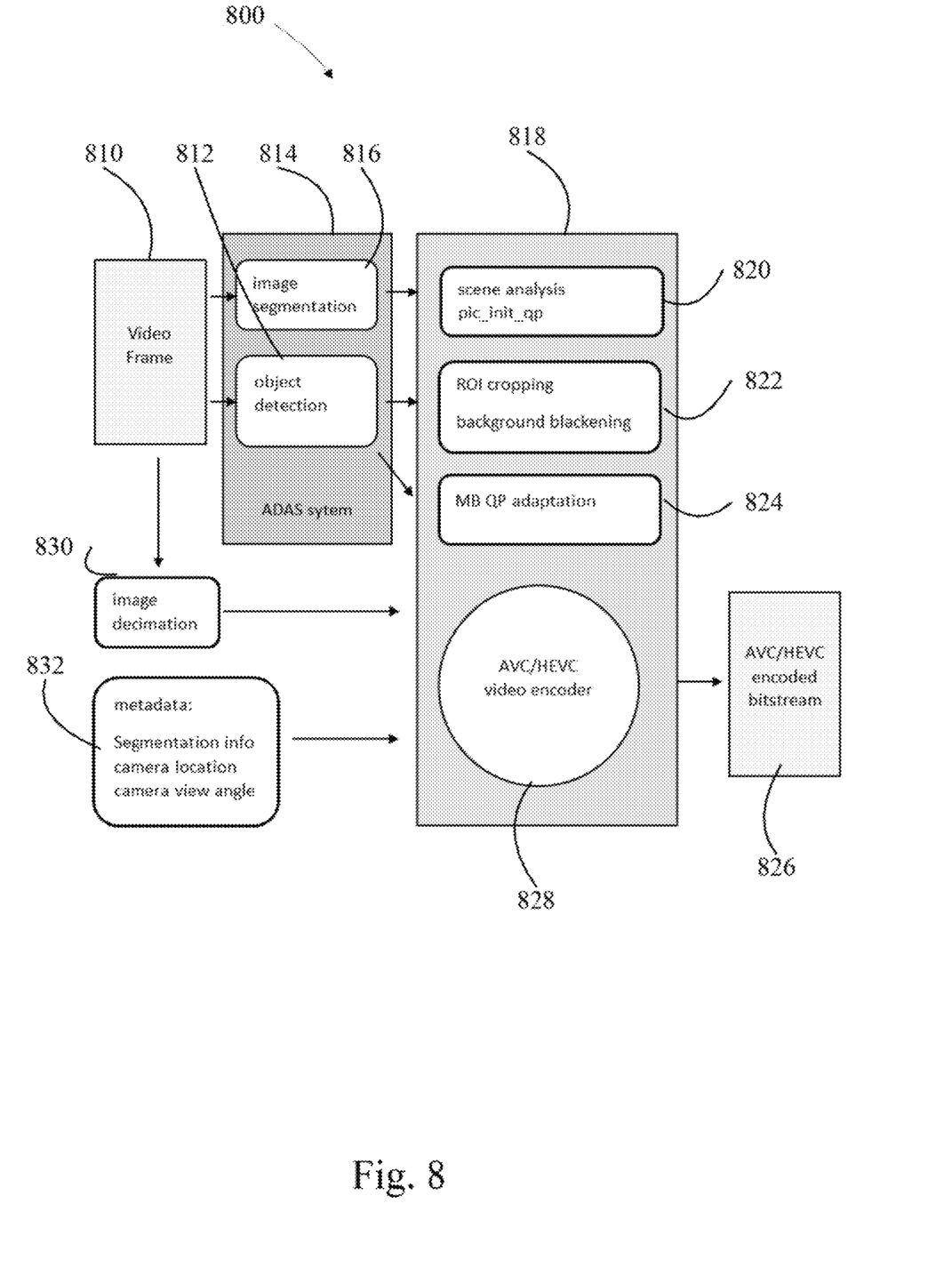
FIG. 8 is an encoding process chart in accordance with one embodiment of the disclosure.

FIG. 8 depicts one example of the system and method. In this example the video camera module 810 captures the visual images at a specified resolution and frame rate. The video camera may be a cmos based camera, an infrared camera, lidar, radar or the like.

The GPS may provide real time location information at a certain rate and precision. An accelerometer and further digital filtering may enhance the sampling rate and accuracy. A gyroscope and off-line calibration may provide the right view angle of camera. The location information obtained from the GPS, and the view angle obtained from the gyroscope are recorded for the frame as metadata and multiplexed into the bitstream.

An advanced driver assistance system 814 (ADAS) may receive the outputted information of image segmentation 816 and object detection 812.

The encoder 818 includes scene analysis 820 from a current frame which is used to set the pic_init_qp for that frame, where pic_init_qp contains the initial quantization step for AVC/HEVC standard coding. The value is a function of scene complexity and scene importance. The scene complexity is one factor of the video compression efficiency. A more complex scene may require more bits to code with same quality or higher quantization to preserve bit rate while compromising the quality of reconstructed picture. The second term, scene importance, is to help this trade-off and is configurable by application users.

ROI cropping 822 occurs in one example through semantic segmentation in conjunction with the ADAS system to detect free space, obstacles, etc. During the same procedure the method provides useful insights into region of interest (ROIs). In this example system, the macroblocks included in ROIs are encoded, while other remaining areas are removed or blacked out.

Adaptive quantization 824 may be based on object categories and may be undertaken by recognizing that ROIs may belong to different categories, such as vehicles or pedestrians, which may imply different quantization level for video compression. Variable quantization may be employed on objects adapted to its object category.

The AVC/HEVC encoder 828 is configured as an infinitely long group of pictures, wherein a first instantaneous decoder refresh (IDR) is followed by predicted pictures (P). The macroblocks outside the ROI are encoded in an efficient manner, for example P-Skip mode. The encoder outputs an encoded bitstream 826 that may reflect a standard such as AVC or HEVC.

The time, weather and other supporting information are recorded for the encoded frames and inserted into the bitstream as metadata 832 as well as a camera location given by the GPS and a camera angle view given by the gyroscope.

Optionally, if a street map is not available, the original video pictures with deep decimation 830 may be utilized and expanded. The smaller resolution bitstream may serve as a supplemental source for final playback fusion before display.

The static parts of the scenes of images, which are the input of the encoded video may be reconstructed given the location and the view angle of the camera.

The quantization level may be adapted to the interest level of object categories and user interest.

Figure 9:
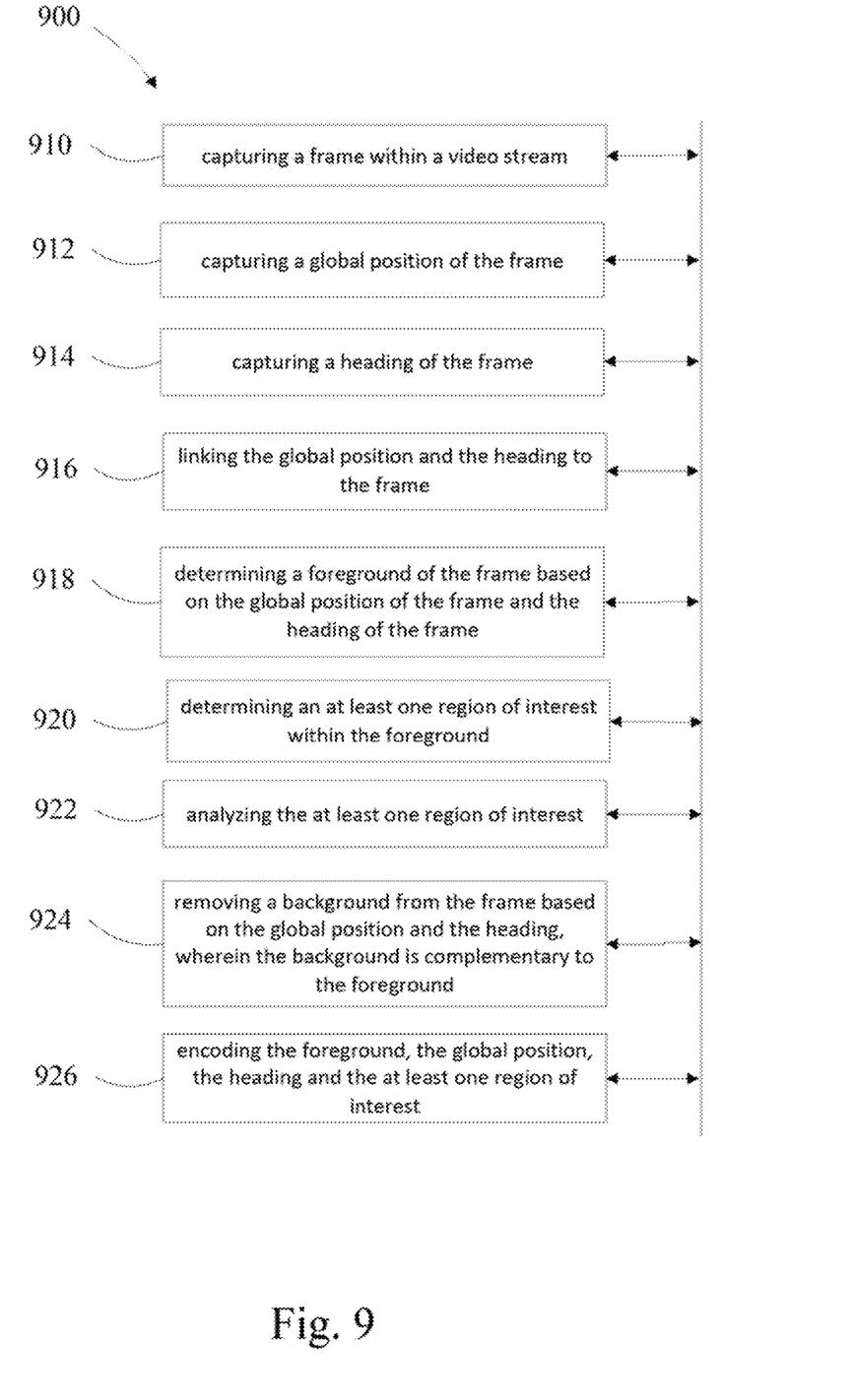
FIG. 9 is a first method of encoding in accordance with one embodiment of the disclosure.

FIG. 9 depicts an example method of ultra-low rate video encoding 900, including capturing 910 a frame within a video stream, the video stream may be in the visual spectrum, infrared, lidar, radar of the like. The method includes capturing 912 a global position of the frame which may in one example be a GPS system or the like. A gyroscope may be used in capturing 914 a heading of the frame to set a camera angle for later review. At this point the method provides linking 916 the global position and the heading to the frame to provide a context for the frame. The method provides determining 918 a foreground of the frame based on the global position of the frame and the heading of the frame. In this example the foreground will contain those items of interest to a driver such as pedestrians, other automobiles the roadway and the like. Within this foreground the method determines 920 an at least one region of interest within the foreground and analyzes 922 the at least one region of interest. To reduce the computational overhead and storage, the method provides removing 924 a background from the frame based on the global position and the heading, wherein the background is complementary to the foreground. The foreground is encoded 926 along with the global position, the heading and the at least one region of interest.

Figure 10:
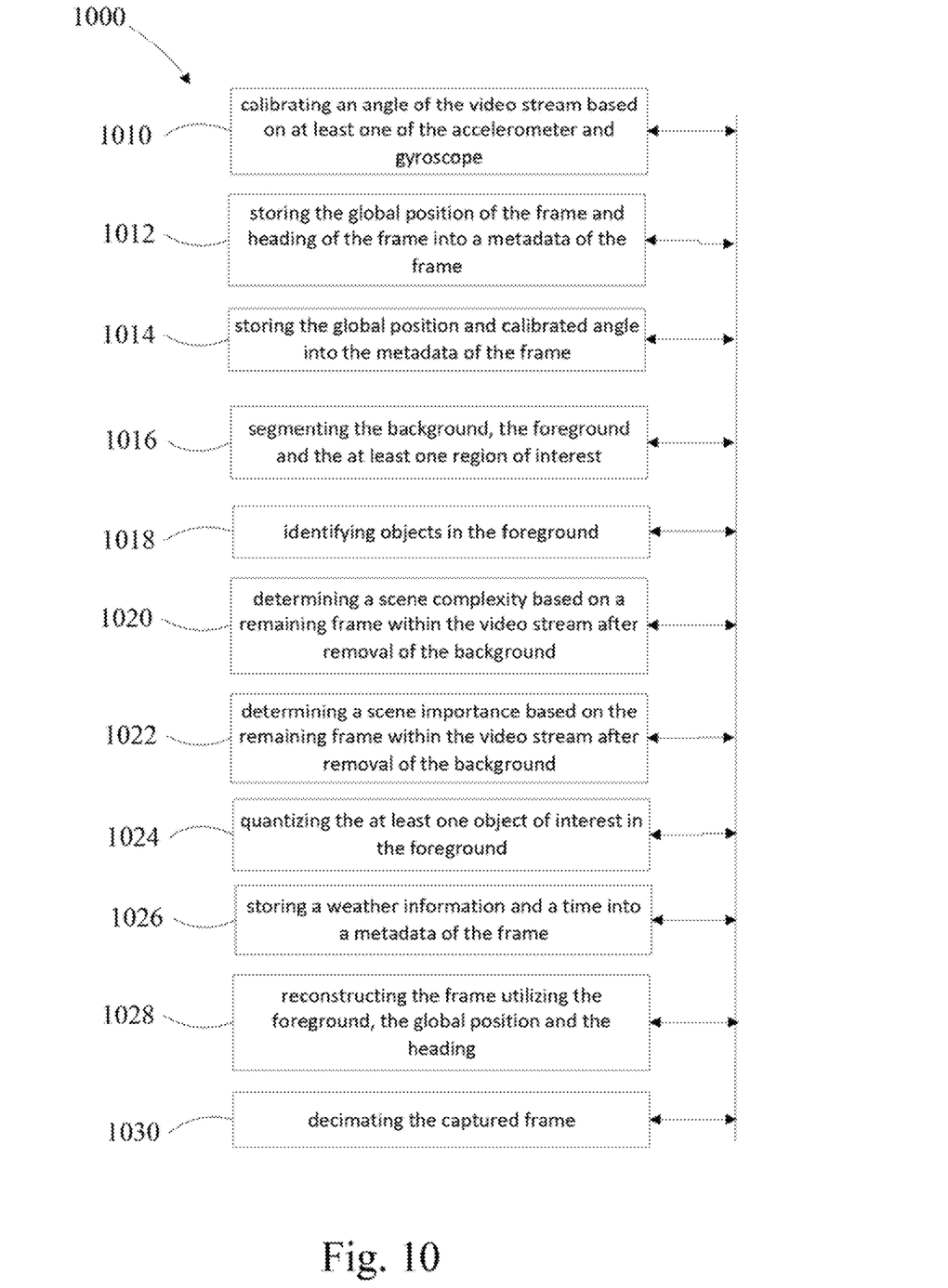
FIG. 10 is a second method of encoding in accordance with one embodiment of the disclosure.

FIG. 10 depicts another example method of ultra-low rate video encoding 1000 where, the heading is provided by at least one of an accelerometer and gyroscope. The encoding may include calibrating 1010 an angle of the frame based on at least one of the accelerometer and gyroscope, storing 1012 the global position of the frame and heading of the frame into a metadata of the frame and storing 1014 the global position and calibrated angle into the metadata of the frame.

The encoding may also comprise segmenting 1016 the background, the foreground and the at least one region of interest and identifying 1018 objects in the foreground.

The method may provide determining 1020 a scene complexity based on a remaining frame within the video stream after removal of the background and determining 1022 a scene importance based on the remaining frame within the video stream after removal of the background.

The encoding may provide quantizing 1024 the at least one object of interest in the foreground and storing 1026 a weather information and a time into a metadata of the frame.

The method may also provide reconstructing 1028 the frame utilizing the foreground, the global position and the heading and/or decimating 1030 the captured frame.

Decoding the encoded bitstream may be done by utilizing standard decoding process defined by standards such as AVC/HEVC and the like, wherein the content inside the ROI is reconstructed. In one example decoding frames includes extracting information related to location and camera view angle.

The 3D street view map pictures may be obtained based on the information obtained from the location and camera angle view as well as time and weather information.

A 3D street view may be rendered based on location, view angle, time and weather from a 2D image. If the street view map is not available, decode the decimate bitstream and up-sample to the original dimension. The ROI information may be extracted from the encoded bitstream.

Blending of stored images and the captured images may utilize pixels within the ROI and using values from the decoded bitstream and pixels outside ROI from rendered 3D street view pictures. Pixels at the ROI boundary may be blended using adaptive blending, where a feature matching process and multi-band blending filter may be utilized.

Figure 11:
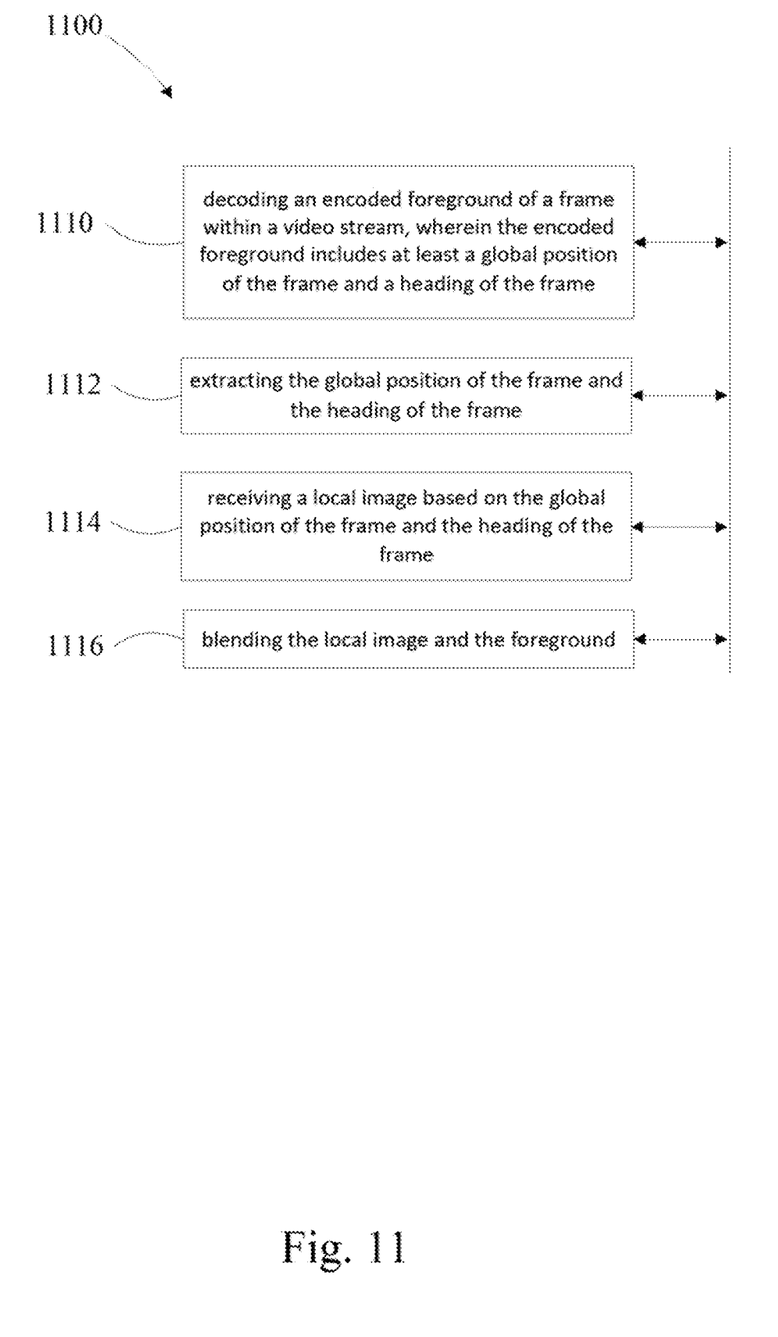
FIG. 11 is a first method of decoding in accordance with one embodiment of the disclosure.

FIG. 11 depicts an example method of ultra-low rate video decoding 1100, including decoding 1110 an encoded foreground of a frame within a video stream, wherein the encoded foreground includes at least a global position of the frame and a heading of the frame. The method also includes extracting 1112 the global position of the frame and the heading of the frame. The method additionally includes receiving 1114 a local image based on the global position of the frame and the heading of the frame and blending 1116 the local image and the foreground.

Figure 12:
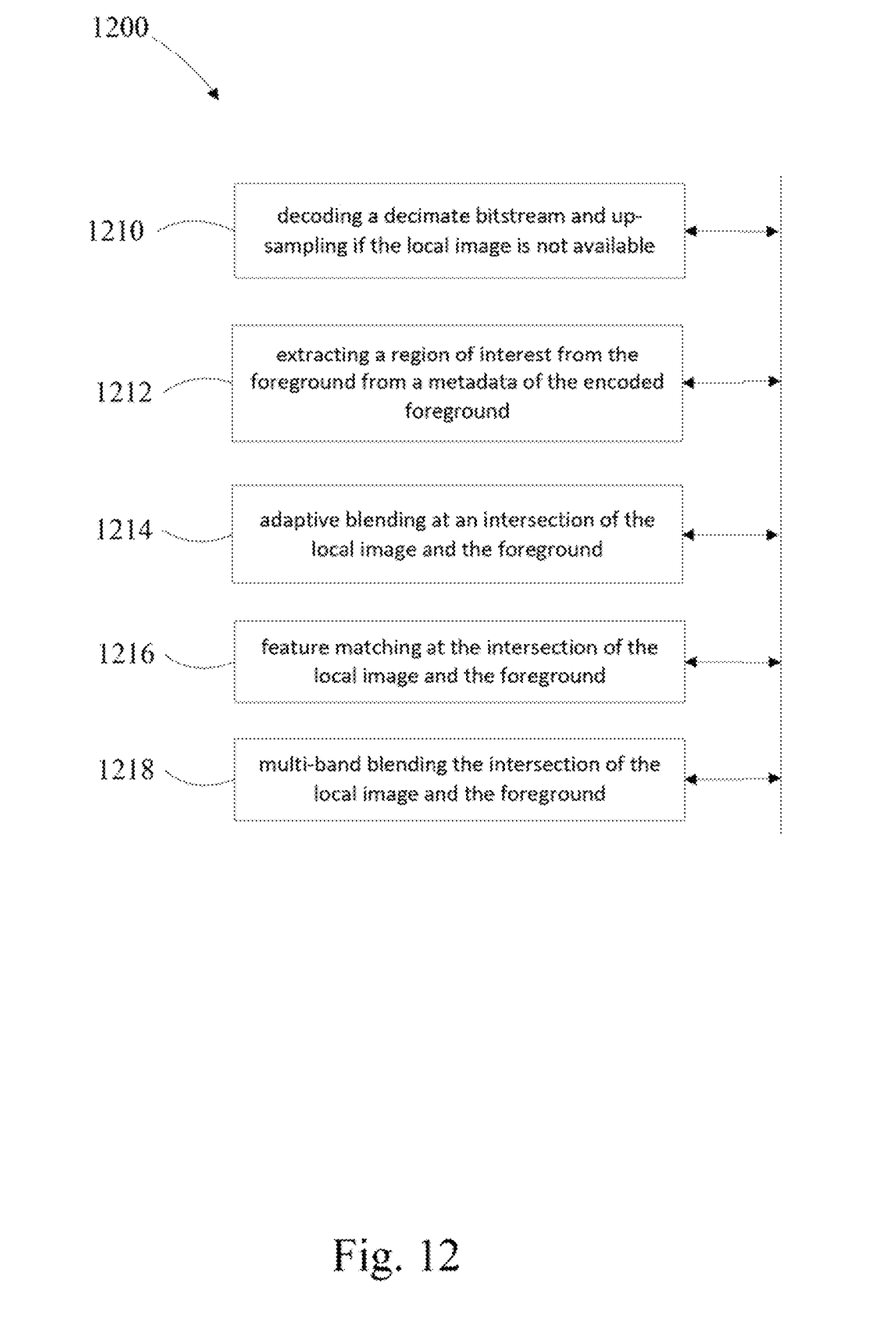
FIG. 12 is a second method of decoding in accordance with one embodiment of the disclosure.

FIG. 12 depicts another example of ultra-low rate video decoding 1200 wherein the blending is based in part on weather information and a time. The example may also include decoding 1210 a decimated bitstream of the frame and up-sampling if a local image is not available.

The method may include extracting 1212 an at least one region of interest from the foreground and from a metadata of the encoded foreground and at least one of adaptive blending 1214, feature matching 1216 and/or multi-band blending 1218 at an intersection of the local image and the foreground.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the an to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment" "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of ultra-low rate video encoding, comprising:
    capturing a frame within a video stream;
    capturing a global position of the frame;
    capturing a heading of the frame;
    linking the global position and the heading to the frame;
    determining a foreground of the frame based on the global position of the frame and the heading of the frame;
    determining an at least one region of interest within the foreground, wherein the region of interest includes a pedestrian and a vehicle;
    analyzing the at least one region of interest;
    removing a background from the frame based on the global position and the heading, wherein the background is complementary to the foreground;
    encoding the foreground, the global position, the heading and the at least one region of interest;
    calibrating an angle of the frame based on at least one of an accelerometer and gyroscope;
    wherein, the heading is provided by at least one of the accelerometer and gyroscope.

2. The method of ultra-low rate video encoding of claim 1 further comprising, storing the global position of the frame and heading of the frame into a metadata of the frame.

3. The method of ultra-low rate video encoding of claim 2 further comprising, storing the global position and calibrated angle into the metadata of the frame.

4. The method of ultra-low rate video encoding of claim 1 further comprising, segmenting the background, the foreground and the at least one region of interest.

5. The method of ultra-low rate video encoding of claim 4 further comprising, identifying objects in the foreground.

6. The method of ultra-low rate video encoding of claim 1 further comprising, determining a scene complexity based on a remaining frame within the video stream after removal of the background.

7. The method of ultra-low rate video encoding of claim 6 further comprising, determining a scene importance based on the remaining frame within the video stream after removal of the background.

8. The method of ultra-low rate video encoding of claim 1 further comprising, quantizing the at least one object of interest in the foreground.

9. The method of ultra-low rate video encoding of claim 1 further comprising, storing a weather information and a time into a metadata of the frame.

10. The method of ultra-low rate video encoding of claim 1 further comprising, reconstructing the frame utilizing the foreground, the global position and the heading.

11. The method of ultra-low rate video encoding of claim 1 further comprising, decimating the captured frame.

12. A method of ultra-low rate video decoding, comprising:
    decoding an encoded foreground of a frame within a video stream, wherein the encoded foreground includes at least a global position of the frame and a heading of the frame, wherein the foreground includes at least one region of interest that includes a pedestrian and a vehicle;
    extracting the global position of the frame and the heading of the frame;
    receiving a local image based on the global position of the frame and the heading of the frame;
    blending the local image and the foreground; and
    decoding a decimate bitstream of the frame and up-sampling if the local image is not available.

13. The method of ultra-low rate video decoding of claim 12 wherein the blending is based in part on a weather information and a time.

14. The method of ultra-low rate video decoding of claim 12 further comprising extracting an at least one region of interest from the foreground and from a metadata of the encoded foreground.

15. The method of ultra-low rate video decoding of claim 12 further comprising adaptive blending at an intersection of the local image and the foreground.

16. The method of ultra-low rate video decoding of claim 15 further comprising feature matching at the intersection of the local image and the foreground.

17. The method of ultra-low rate video decoding of claim 15 further comprising multi-band blending the intersection of the local image and the foreground.

* * * * *